(12) United States Patent
Mascarello et al.

(10) Patent No.: US 8,905,080 B2
(45) Date of Patent: Dec. 9, 2014

(54) DEVICE FOR PROCESSING AND CONDITIONING OF MATERIAL TRANSPORTED THROUGH THE DEVICE

(75) Inventors: Francesco Mascarello, Allschwil (CH); Philipp Rudolf Von Rohr, Muttenz (CH); Cédric Hutter, Zürich (CH); David Ruppen, Glis (CH)

(73) Assignees: ETH Zurich, Zurich (CH); Premex Reactor AG, Lengnau (CH)

( * ) Notice: Subject to any disclaimer, the term of this patent is extended or adjusted under 35 U.S.C. 154(b) by 55 days.

(21) Appl. No.: 13/376,266

(22) PCT Filed: Jun. 14, 2010

(86) PCT No.: PCT/EP2010/058290
§ 371 (c)(1),
(2), (4) Date: Dec. 5, 2011

(87) PCT Pub. No.: WO2010/142806
PCT Pub. Date: Dec. 16, 2010

(65) Prior Publication Data
US 2012/0080113 A1    Apr. 5, 2012

(30) Foreign Application Priority Data
Jun. 12, 2009   (EP) .................................... 09162612

(51) Int. Cl.
*F15D 1/04*   (2006.01)
*B01J 4/00*   (2006.01)
*B01J 19/24*   (2006.01)
*B01F 5/04*   (2006.01)
*B01F 15/06*   (2006.01)
*B01F 5/06*   (2006.01)

(52) U.S. Cl.
CPC .... *B01J 19/2415* (2013.01); *B01J 2219/00094* (2013.01); *B01J 2208/0084* (2013.01); *B01J 4/002* (2013.01); *B01F 5/0451* (2013.01); *B01J 19/2485* (2013.01); *B01F 15/065* (2013.01); *B01F 5/0691* (2013.01)
USPC ............... 138/42; 138/114; 138/148; 138/41; 165/154

(58) Field of Classification Search
USPC .............. 138/41, 42, 114, 148; 165/154, 143
See application file for complete search history.

(56) References Cited

U.S. PATENT DOCUMENTS 1,401,609 A * 12/1921 Klein ........................... 48/189.6
1,959,314 A * 5/1934 Wile .............................. 210/448
(Continued)

FOREIGN PATENT DOCUMENTS

JP   59125396 A * 7/1984
WO   01/12312   2/2001
(Continued)

OTHER PUBLICATIONS

Microreactors in Organic Synthesis and Catalysis, Edited by Thomas Wirth, Generative Method: Selective Laser Melting (SLM), 2008, Wiley-VCH Verlag GMbH & Co., KGaA, 5 pages.

*Primary Examiner* — Patrick F Brinson
(74) *Attorney, Agent, or Firm* — Nixon & Vanderhye P.C.

(57) ABSTRACT

The present invention relates to a device for treatment of material transported through the device comprising at least one porous element consisting of solid, for example metallic, structure which allows cross-flow of the material through the porous element. A device in accordance with the invention is particularly useful as mixer or heat exchanger or to carry out chemical reactions under homogenous and heterogeneous conditions. Such a device hereinafter also referred as reactor may comprises a tube (1) having a cylindrical wall (2) with one inlet end (3) and one outlet end (4). Arranged in the tube (1) is at least one cylindrical porous element (5) consisting of solid metal structure, wherein said porous element (5) comprises a plurality of hollow spaces that are connected to each other and form an interconnected cavity network and wherein the at least one porous element (5) and the cylindrical wall (2) are made in one piece. The porosity $\epsilon$ of the at least one porous element (5) is between 0.8 and 0.95.

12 Claims, 3 Drawing Sheets

(56) References Cited

U.S. PATENT DOCUMENTS

Figure 1:
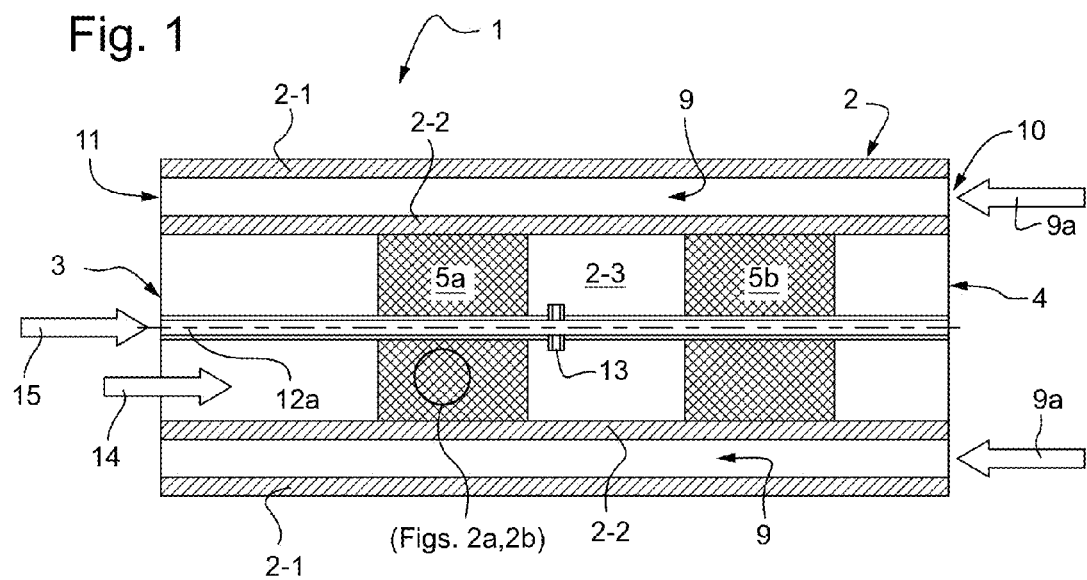

| | | | |
|---|---|---|---|
| 2,576,610 A * | 11/1951 | Kunzog | 138/41 |
| 3,319,659 A * | 5/1967 | Bauer | 138/41 |
| 3,677,300 A * | 7/1972 | King | 138/42 |
| 3,823,743 A * | 7/1974 | King | 138/42 |
| 5,097,866 A * | 3/1992 | Shapiro-Baruch et al. | 137/544 |
| 5,104,233 A * | 4/1992 | Kojima | 366/339 |
| 5,257,757 A * | 11/1993 | Paul et al. | 244/117 A |
| 5,639,070 A | 6/1997 | Deckard | |
| 6,145,544 A * | 11/2000 | Dutertre et al. | 138/39 |
| 7,370,675 B2 * | 5/2008 | Cancade et al. | 138/45 |
| 2001/0030040 A1 * | 10/2001 | Xiao | 165/154 |
| 2003/0031419 A1 | 2/2003 | Simmons et al. | |
| 2006/0245987 A1 | 11/2006 | Schmidt | |
| 2007/0269356 A1 | 11/2007 | Mori et al. | |
| 2012/0077992 A1 | 3/2012 | Hutter et al. | |

FOREIGN PATENT DOCUMENTS

| | | |
|---|---|---|
| WO | 03/089130 | 10/2003 |
| WO | 2006/082933 | 8/2006 |

\* cited by examiner

DEVICE FOR PROCESSING AND CONDITIONING OF MATERIAL TRANSPORTED THROUGH THE DEVICE

This application is the U.S. national phase of International Application No. PCT/EP2010/058290 filed 14 Jun. 2010 which designated the U.S. and claims priority to EP 09162612.7 filed 12 Jun. 2009, the entire contents of each of which are hereby incorporated by reference.

The subject matter disclosed and claimed herein was made as a result of activities undertaken within the scope of a joint research agreement between DSM NUTRITIONAL PRODUCTS AG, an affiliate of the intellectual holding company for Royal DSM, DSM IP Assets, B.V., ETH ZURICH and PREMEX REACTOR AG.

The present invention relates to a device for treatment of material transported through the device comprising at least one porous element consisting of solid, for example metallic, structure which allows cross-flow of the material through the porous element.

A device in accordance with the invention is useful as a mixer or heat exchanger for fluid or fluidized material transported through the device. The device is also useful to carry out chemical reactions under homogenous and heterogeneous conditions.

In particular, the device according to the invention comprising a tube having a wall, preferably a cylindrical wall, with at least one inlet end and at least one outlet end, wherein in the tube at least one porous element consisting of a solid foamy structure is arranged, wherein the porous element comprises a plurality of hollow spaces that are connected to each other and form an interconnected network, and wherein the at least one element and the wall are made in one piece.

The device and the at least one porous element may be manufactured in one piece by Selective Laser Sintering (SLS) a method described for example in U.S. Pat. Nos. 5,639,070, 5,732,323 and 6,676,892 or by Electron Beam Melting (EBM).

EBM process has some advantages which are as follows:
No thermal treatment
Smoother surfaces available than via SLS
2-3 times faster than SLS Materials which can be used by this method in accordance with the present invention are Stainless steel, Titanium Ti6Al4V, Titanium Ti6Al4V ELI, Titanium Grade 2, Cobalt-Chrome, ASTM F75. Additional materials which can be used according to the present invention by EBM method are Titanium aluminide, Inconel (625 & 718), Stainless steel (e.g. 17-4), Tool steel (e.g. H13), Aluminium (e.g. 6061), Hard metals (e.g. NiWC), Copper (e.g. GRCop-84), Beryllium (e.g. AlBeMet), Amorphous metals, Niobium.

In a preferred embodiment of the invention, the porosity $\epsilon$ of the at least one porous element is >0.5, preferably between 0.6 and 0.95, more preferably between 0.8 and 0.95. The porosity of the porous element describes the fraction of void space in the material. It is defined by the ration $V_V/V_T$, wherein $V_V$ is the volume of void-space and $V_T$ is the total occupied by the porous element in the device.

In accordance with a further embodiment of the device, the hollow spaces of the at least one porous element are substantially sphere-shaped and have an average equivalent diameter of 0.5 to 20 mm, preferably of 1 to 10 mm, more preferably of 1.5 to 5 mm.

The shell which defines the surface area of the sphere-shaped hollow spaces further comprises a plurality of interconnecting holes which allow cross flow of the material. The average equivalent diameter of said holes is in the range of 0.01 to 5 mm, preferably in the range of 0.1 to 5 mm, more preferably in the range of 0.1 to 2 mm.

In a particular embodiment of the invention, the shell is manufactured such that it comprises a smooth or rough or partially smooth and partially rough surface.

In accordance with the physical properties of the device, the tube and the at least one porous element are designed such that the Reynolds number Re for flow in the tubular pipe is in the range of 1 to 100,000. The Reynolds number Re is a dimensionless number that gives a measure of the ratio of inertial forces to viscous forces and, consequently, it quantifies the relative importance of these two types of forces for given flow conditions.

In another preferred embodiment of the invention, the preferably cylindrical wall and the at least one porous element are made from a metal selected from the group consisting of iron, titanium, zirconium, hafnium, vanadium, platinum, niob, rare earths and tantalum, or a metal alloy made from at least one of these metals which may comprise in its structure additional elements as carbon, silicium or other microelements.

In just another preferred embodiment of the invention, the preferably cylindrical wall and the at least one porous element are made from ceramic materials. Examples of ceramic materials are aluminum oxide, silicon oxide, zirconium(IV) oxide, cordierite, steatite and/or carbon and/or silicon carbid.

In a preferred example, the device is designed for the use as a mixer or heat exchanger or for the continuous handling of single and multiphase chemical reactions, as for example fast, exothermic, mixing sensitive or temperature sensitive reactions. The device provides a fast mixing of reactants and an extremely enhanced heat transfer. The fixed connection of the porous structure to the wall of the reactor is of major importance to guarantee a good heat transfer and very high mechanical stability. This enables the possibility to process up to high temperatures and pressures. The structure of the porous element has also a strong influence on the axial dispersion, the residence time distribution in the reactor respectively, which is an important parameter for the scaling of chemical plants.

For conventional batch reactors, which are often used in chemical plants, the energy dissipation may be controlled by the rotational speed of the stirrer. For continuous systems only the flow rate can be changed which is directly linked to the residence time and its distribution. This correlation is a disadvantage compared to batch reactors, but can be handled by clearly defined geometry of the porous elements designed by the aid of Computational Fluid Dynamics (CFD) which are then manufactured, e.g. by the SLS method mentioned above.

Hydrogenation of functional groups in organic molecules are examples of fast multiphase, exothermic reactions. Such reactions are part of environmentally acceptable reaction routes available for organic synthesis. For example, the precursors, i.e. intermediates for Vitamin A and Vitamin E are produced by three major types of reactions. One among them is catalytic selective hydrogenation, a multiphase, i.e. three-phase reaction, in which the reaction mixture comprises a liquid phase, a non-dissolved solid catalytic phase and a gaseous phase.

The most common reactor type for carrying out such hydrogenation reactions is the batch wise operated slurry reactor. Mainly stirred tanks and loop reactors are in use. Due to the strong exothermic reaction, a combination of external and internal heat exchangers is necessary for efficient temperature control. In addition, the concentration of catalysts used in the reaction is relatively low (<10%), which limits the reaction rate. Finally, the heat transfer performance of conventional reactors is in the order of 0.2 to 5 kW m$^{-3}$ K$^{-1}$. Therefore, large reactor volumes are necessary to get acceptable production rates.

The performance of hydrogenation processes and the product distribution is strongly influenced by the catalyst activity/selectivity and the interaction of chemical kinetics with transport phenomena in the reactor.

In three phase reactions one of the main problems to overcome is avoiding internal and external mass transfer limitations. Therefore, catalyst particles of small diameter are required. In technical application the minimal size, however, is limited due to catalyst handling like solids charging, filtration and discharging that often pose safety and environmental problems, and can lead to significant catalyst losses and economically unfavorable processes.

Further, as hydrogenations are highly exothermic, the removal of the reaction heat becomes the main limitation for the reactor performance. Therefore, in a slurry reactor the mass of the catalyst per volume is limited by its heat exchange capacity.

A further aspect concerns process safety and sustainable production under controlled pressure. Product intermediates in a multi-step chemical process as described above are often unstable and decompose releasing a huge amount of heat. The consequences are thermal runaway and explosion.

To increase the safety of the chemical reactions a strict heat management is required. In addition, the amount of reactants in the reactor should be as small as possible to reduce the hazard potential.

These problems of selective reactions may be solved by using a device hereinafter also referred to as plug flow reactor, design as defined by the invention. Such a reactor may be operated in a continuous mode. This operational mode avoids the storage of large quantities of unstable product intermediates as in the case of batch processes and increases the safety of chemical reactions. This process integration is especially important to process thermal instable intermediates to stable ones.

The continuous plug flow reactor hereinafter described is optimized in its structured geometry in terms of heat and mass transfer. The plug flow like velocity field in the reactor guarantees an isothermal and homogeneous operating mode. It can be geometrically adapted to the heat transfer coefficients, viscosities, densities and the mixing behavior of the fluids used by the chemical reaction to optimize the ratio of operating expense (pressure drop, heating energy etc) and product quality (selectivity, conversion etc.). On the other hand, the structure of the at least one porous element fulfills not only the requirements of static mixing elements, it also acts as a flame arrestor for critical reactions and it permits mechanical and chemical stability of the continuous system through the convenient molding and the right choice of the material.

To fulfill all those requirements the geometry of the at least one porous element must not be consistent over the length of the element and can be adjusted to the different conditions. Furthermore and dependent on the reaction which takes place in the tube, the porous element may stretch across the whole length of the tube or may have a length of 10 to 90%, preferably 50 to 80%, of the total length of the reactor tube.

A plug flow reactor according to the invention has characteristic dimensions in the millimeter range. Preferably, the reactor is used with channel diameters between 0.5 and 300 mm.

In a preferred embodiment of the invention, the reactor tube has a diameter which is in the range of from 1 to 300 mm, preferably from 2 to 100 mm, more preferably from 5 to 50 mm.

With regard to the use of the device as reactor to carry out chemical reactions, it is a fundamental object within the scope of the present invention to propose the use of catalysts. In plug flow reactors, catalyst particles can be used as in traditional suspension reactors in mobilized or immobilized form. If the catalyst particles are used in immobilized, the preferably sintered metallic structure of the porous element(s) can act as a support for the catalysts.

Another main feature of the reactor is the high surface to volume ratio compared to traditional chemical reactors. The specific surface of the reactor established by the at least one porous element lies in the range of 500 to 50,000 m$^2$ m$^{-3}$, whereas the specific surface in typical laboratory and production vessels is about 10 m$^2$ m$^{-3}$ and very seldom exceeds 100 m$^2$ m$^{-3}$.

Depending on the required specific surface of the at least one porous element, the metallic shell comprises a smooth or rough or partially smooth and partially rough surface.

In a preferred embodiment of a plug flow reactor, the tube comprises a double-walled cylindrical housing defining an annular chamber, wherein said annular chamber includes at least one fluid inlet and at least one fluid outlet which are connected to a heat exchanger for continuously transporting a heat exchange fluid through said chamber for cooling or heating the reaction mixture.

Alternatively or in combination with the double walled cylindrical housing, the tube may comprises a central innertube arranged in longitudinal direction of the cylindrical wall, wherein said inner tube includes at least an outlet for adding a compound of the reaction process to the material transported through the tube or it is arranged with an inner tube without an outlet for transporting a heat exchange fluid through the reactor.

Figure 2A:
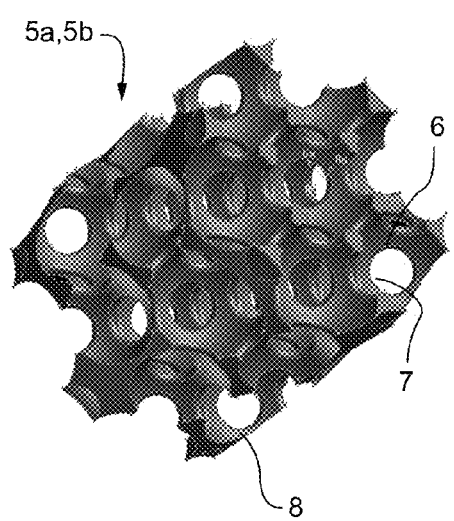
Figure 2B:
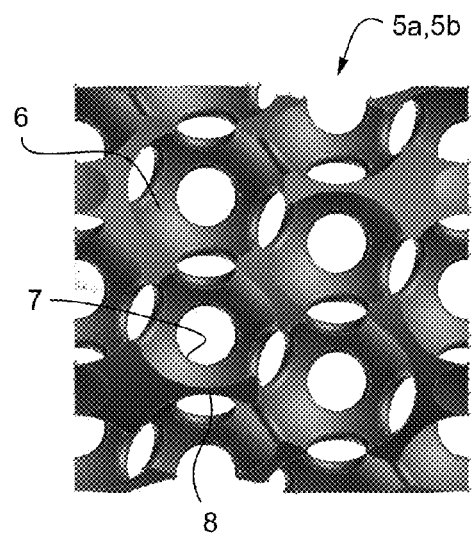
Figure 3:
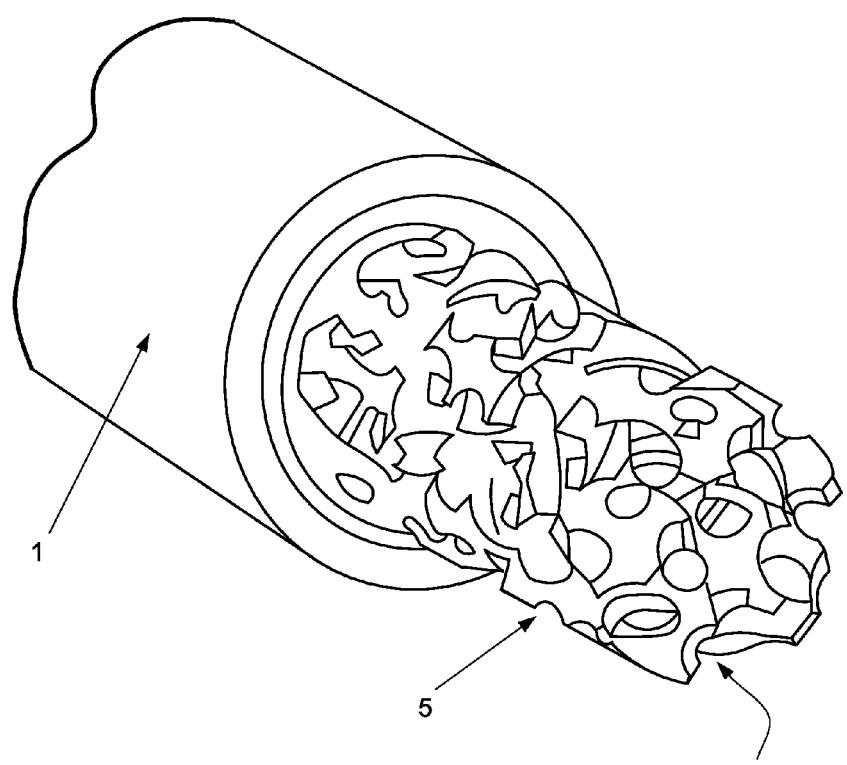
Figure 4:
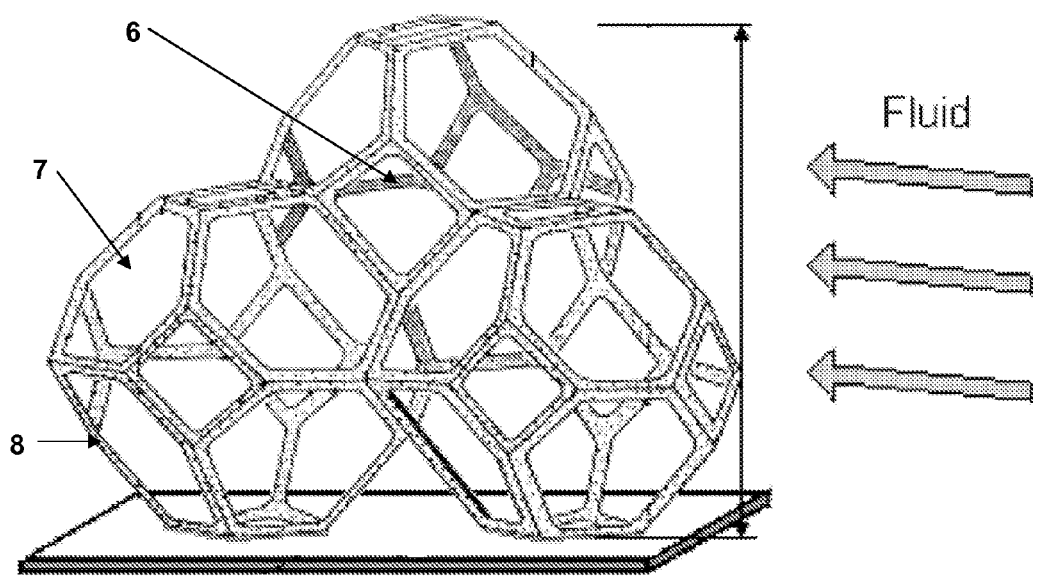

In the following, the invention will be described in more detail and in connection with the accompanying figures wherein, FIG. 1 shows a schematic view of a reactor in accordance with the present invention with two porous elements, FIGS. 2a and 2b show a CAD (Computer assisted design) view of the foamy structure of the porous elements and FIG. 3 shows a photographic picture of a preferred plug flow pipe useful for carrying out chemical reactions manufactured by SLS technology, wherein an undetachably connected porous element is dissected out from the pipe wall, for the sake of better demonstration of the construction principle, and FIG. 4 shows an alternative sketch of hollow chambers of the porous elements.

1. BASIC STRUCTURE OF A PLUG FLOW REACTOR ACCORDING TO THE INVENTION

FIG. 1 is an exemplary cross sectional schematic view of a double-walled tubular reactor 1 in accordance with the present invention. The tubular reactor 1 comprises a double-walled cylindrical housing 2 comprised of an outer cylindrical tubular wall 2-1 and an inner cylindrical tubular wall 2-2 which define therebetween an annular chamber 9. A central tubular space 2-3 is defined by the inner cylindrical tubular wall 2-2. The housing 2 is provided with one inlet end 3 and one outlet end 4 between which a reaction medium flows in the direction of arrow 14 through the central tubular space 2-3. Arranged within the central tubular space 2-3 of the inner cylindrical tubular wall 2-2 of the tubular reactor 1 are upstream and downstream cylindrical porous elements 5a and 5b, respectively, consisting of solid metal structure. As shown in FIGS. 2a, 2b and 3, the porous elements 5a and 5b each include a plurality of hollow spaces 6 that are connected to each other and form an interconnected cavity network.

Cylindrical wall or housing 1 and the porous elements 5a, 5b are non-detachably connected to one another and are made from steel or titanium.

If the reactor is for example designed to carry out hydrogenation reactions, the tube 1 has preferably an inner-diameter which is in the range of from 2 to 100 mm.

The porosity $\epsilon$ of the two porous elements 5 is between 0.8 and 0.95.

The hollow spaces 6 of the at least one porous element are substantially sphere-shaped and have an average diameter of 2 to 5 mm. Furthermore, the metallic shell defining the sphere-shaped hollow spaces 6 additionally comprises a plurality of holes 7 which allow cross flow of the material, wherein the average diameter of said holes is in the range of 0.5 to 1 mm.

Another metallic or non-metallic shell or framework which defines the hollow spaces 6 and holes 7 of the porous elements 5a, 5b is exemplified in FIG. 4. As shown the non-metallic shell or framework depicted in FIG. 4 consists of a plurality of cross-wise linked bars 8. In a special embodiment of the invention, these bars 8 comprise a hollow structure consisting of interconnected channels which dependent on the specific use may act as a further heat exchange system.

The annular chamber 9 of the cylindrical housing 2 of the tubular reactor 1 shown in FIG. 1 includes a fluid inlet 10 and fluid outlet 11 which are connected to a heat exchanger (not shown) for continuously transporting a heat exchange fluid through the annular chamber 9 in the direction of arrows 9a.

The tubular reactor 1 also comprises a central inner tube 12 which is arranged in longitudinal direction of the double-walled cylindrical wall housing 2. The central inner tube 12 defines a central inner passageway 12a and includes one outlet 13 for adding at least one compound flowing through the passageway 12 between the inlet end 3 and the outlet end 4 of the housing 2 in the direction of arrow 15 to the reaction medium transported through the tubular reactor 1 in the direction of arrow 14. The outlet 13 is positioned so as to discharge at least one compound to the reaction medium in the central tubular space 2-3 defined between the upstream and downstream porous elements 5a, 5b.

In another preferred embodiment of the invention, catalyst particles are attached on the surface of the metallic shell. The type of catalyst usable according to the invention is dependent on the reaction for which the reactor is intended. In accordance with hydrogenation reactions described herein preferred catalysts are selected from the group consisting of Pt-catalysts, Pd-catalysts, Ni-catalysts and oxides of transition metals, as for example Pd, $Pd(OH)_2$, Pd/C, $Pd/BaSO_4$, $Pd/CaCO_3$, $Pd/Al_2O_3$, Pt, $PtO_2$, Ni, Raney Ni and Ru.

2. MANUFACTURING OF A PLUG FLOW REACTOR

In terms of chemical reactions in metal foamy structures some difficulties of commercially available foams had to be solved. On one hand, commercially available material, like aluminum or copper, is critical for chemical reactors, especially in terms of corrosion. On the other hand, the connection from the foam to the wall which is a limiting step in the heat transfer. Different approaches like soldering were tested but no persistent connection was achieved. Therefore and in accordance with the present invention a new manufacturing approach is proposed, which is the so called laser sintering technique (SLS), as described in the introduction. With this technology, a three-dimensional structure of nearly every shape can be designed in a Computer Assisted Design (CAD) software and than manufactured as one single part. This is done by depositing a layer of metal powder, directing energy on a selected position corresponding to the CAD model to sinter it before depositing a new layer and begin the procedure again as it is for example described in U.S. Pat. Nos. 5,639,070, 5,732,323 and 6,676,892. Because the manufacturing process has nearly no limitation in terms of geometry up to a length scale in the order of 50 μm every process specific design criteria can be fulfilled by the manufacturer. These preferences allow very precise scaling for chemical processing by adapting the most influential parameters listed in the following. An alternative approach would be the so called Electron Beam Melting (EBM) process which is also described in the introduction.

3. RESIDENCE TIME

The residence time is an important parameter for the layout design of chemical reactors. In the chemical and pharmaceutical industry discontinuous batch processes are still common. The scale up process from laboratory scale is therefore straight forward in terms of heat and mass transfer. The big advantage of such plants is their high flexibility in production and stable product quality over a batch cycle. But in case of malfunction huge amount of educts get lost. The residence time in such vessels can be controlled very easily. If one want to scale a continuous system, a reactor has to be designed (e.g. plug flow reactor) which guarantees very sharp residence time distributions. This can be simply realized by the insertion of metal foam according to the invention into a tube. The inventors compared conventional and sintered metal foam with the characteristics of fixed beds and common packing material. The results show a similar behavior.

Compared to fixed bed reactors the porosity of metal foam is much higher (in the range of 90%). This leads to smaller pressure drops and therefore less operating costs.

4. HEAT TRANSFER PROPERTIES

Metal foams are already used in the heat exchanger technology to enhance the effectiveness of the heat transfer.

The heat transfer in metal foams was investigated in more detail and in view of chemical reactions and it has been noted that a critical issue for an optimized heat flux is the connection of the foam to the wall.

Conventional foam is inserted into heat exchangers by force fitting. This technique allows a fast adaptation of given heat exchangers to enhance their efficiency. Therefore normally copper or aluminum alloys are used. This leads not only to contact corrosion problems it depicts also a limitation in heat transfer. Different approaches were applied to overcome this problem, e.g. gluing or soldering, but all of them are very circumstantial. Neither of those technologies deals with the manufacturing of the heat exchanger, reactor walls respectively and the foam structure within, as one single part. The application of SLS according to the present invention offers the possibility to manufacture heat exchanger reactors which are stable enough to run reactions even at high temperatures and pressures.

5. MIXING PROPERTIES

In order to compare the mixing efficiency of metal foam to conventional systems the coefficient of variation for different pore sizes was analyzed in a range of Reynolds numbers from 600 to 7600 based on the empty tube diameter.

Values as low as 0.1 were observed after a very short mixing length of 5 cm. The inventors could show that there is an optimum in pore size of the metal foam for mixing properties. This optimum is affected by the turbulence induced by the structure. Therefore the shape of the inner structure, i.e. of the porous elements in accordance with the present invention can be optimized by applying Computational Fluid Dynamics software (CFD-software) in combination with the sintering process.

6. EXAMPLE OF A DEVICE SHOWING INTENSIFIED HEAT AND MASS TRANSFER PROPERTIES

This example presents a continuous plug flow reactor concept for the handling of exothermic multiphase reactions. The main features of the device are the fast mixing of different educts of different states of matter and a fast heat transfer rate. Thereby flow rates in the production scale of kg/min can be achieved at a comparable small pressure drop. By Selective Laser Sintering (SLS) the reactor was constructed as one single part with integrated porous media designed in CAD (computer assisted design).

The inner geometry of the reactor was modelled on the shape of commercial metal foam which was found to be a very good static mixer. The structure is the negative pattern of tetrahedral arranged overlapping spheres with a diameter of 2.9 mm. It has a very high specific surface in the order of $10^4$ $m^2/m^3$ combined with a high porosity of about 85%. This micro-structured geometry has excellent heat and mass transfer properties.

6.1. Characterisation of Single Phase Flow Through the Device by Using Water as Model Fluid All investigations were performed for a range of Reynolds numbers from 600 to 7600 based on the empty tube diameter.

Radial mass transfer: Simultaneous Particle Image Velocimetry (PIV) and Laser Induced Fluorescence (LIF) measurements were performed in orthogonal planes normal to the radial and axial direction downstream of a foam element of 50 mm length and a diameter of 7 mm. Commercial Metal Foams of different pore sizes (20, 30 and 45 pore per inch) and our designed structure were investigated and compared to the empty tube reference case. The mean flow field is clearly distorted by the metal foam. As a consequence the radial dispersion of a tracer dye, injected in front of the foam elements, is strongly increased. This leads to an enhanced mixing efficiency, quantified by the coefficient of variation. Coefficients of variation in the order of 0.1 were achieved.

Axial mass transfer: The big share in radial velocity components contributes to very narrow residence time distributions. The measured dispersion characteristics are similar to those of packed beds and common packing materials at strongly decreased pressure drops and comparable specific surface areas.

Heat transfer: The convective heat transfer is strongly increased by the inserted metal foam elements. A higher heat transfer rate for the foam of 20 ppi was observed compared to the 30 ppi foam. This can be explained by the increased turbulence induced by the foam structure with bigger pores. Absolutely best performance was observed for the sintered reactor which has a bigger specific surface and a fixed connection to the wall.

6.2. Characterisation of Multiphase Flow

In the following, the characterisation (holdup, temporal statistics) of a water-air flow through the sintered structured element and conventional metal foam for different mass flow rates by means of optical measurements and the application of a wire mesh sensor within a tube (inner diameter 7 mm) is presented.

In the experimental setup, an electrode-mesh tomograph is placed at the inlet and outlet of a foam element. The device enables a high-speed visualization of transient gas fraction distributions in two phase flows in pipes. It consists of two electrode grids. The two planes of wire grids are placed into the flow in a short distance from each other. The angle between the wires of both grids is 90°. The wires of the first plane (transmitter plane) were supplied with pulses of a driving voltage.

If the pulse, given to one of the transmitter wires, arrived at a certain wire of the second plane (receiver plane), it is assumed that the crossing point between the two selected wires is occupied by the conducting phase (water). With a CCD camera the flow was simultaneously observed from the side. By this the influence of the sensor on the flow pattern and the inlet flow field were characterised. The results show a very homogeneous dispersion of the gas phase with a narrow bubble size distribution over the cross section of the tube at the reactor outlet.

The presented continuous plug flow reactor was found to be a very interesting alternative system to semi batch processes. The applied manufacturing method allows building nearly any shape which leads to a high flexibility of the modular reactor concept.

The invention claimed is:

1. A mixer or heat exchanger device for processing and conditioning of fluid or fluidized material transported through the device, wherein the device comprises:
 a central inner tube defining a central cylindrical passageway for transport of at least one compound therethrough,
 a double-walled cylindrical housing comprising an inner cylindrical tubular wall surrounding the central inner tube and defining a central tubular space for transport of a fluid or fluidized material therethrough, and an outer cylindrical tubular wall surrounding the inner cylindrical tubular wall, wherein the inner and outer cylindrical tubular walls define an annular chamber therebetween having a fluid inlet and a fluid outlet, and wherein the fluid inlet and fluid outlet of the annular chamber are connected to a heat exchange unit for continuously transporting a heat exchange fluid through the annular chamber, and
 upstream and downstream porous elements positioned within the central tubular space of the inner cylindrical tubular wall consisting of a solid foamy structures; wherein
 the central inner tube includes an outlet positioned between the upstream and downstream porous elements for introducing the at least one compound flowing through the central inner tube to the fluid or fluidized material being transported through the central tubular space, wherein
 each of the upstream and downstream porous elements comprise a plurality of hollow spaces that are connected to each other and form an interconnected network, that allows cross-flow of the reaction medium through the hollow spaces thereof, and wherein
 each of the upstream and downstream porous elements and the inner cylindrical tubular wall of the double-walled cylindrical housing are made in the form of a one piece structure.

2. The device according to claim 1, wherein each of the upstream and downstream porous elements has a porosity $\epsilon$ which is >0.5.

3. The device according to claim 2, wherein the porosity $\epsilon$ of each of the upstream and downstream porous elements is between 0.6 and 0.95.

4. The device according to claim 1, wherein
each of the upstream and downstream porous elements includes shells defining substantially sphere-shaped hollow spaces having an average diameter of 1 to 20 mm, and wherein
each of the shells defining the substantially sphere-shaped hollow spaces comprises a plurality of holes which allow cross flow of the fluid or fluidized material, wherein the holes have an average diameter which is in a range of 0.01 to 5 mm.

5. The device according to claim 4, wherein the shells comprise a surface which is at least partially smooth or rough.

6. The device according to claim 1, wherein each of the upstream and downstream porous elements exhibits a Reynolds number which between 1 and 100,000 for flow of fluid or fluidized material transported through the central tubular space of the inner cylindrical tubular wall.

7. The device according to claim 1, wherein the cylindrical tubular wall and each of the upstream and downstream porous elements are made from a metal or an alloy of at least one metal selected from the group consisting of iron, titanium, zirconium, hafnium, vanadium, niob, rare earths and tantalum.

8. The device according to claim 1, wherein the cylindrical tubular wall and each of the upstream and downstream porous elements are made from ceramic materials.

9. The device according to claim 8, wherein the ceramic material is selected from the group consisting of aluminum oxide, silicon oxide, zirconium(IV) oxide, cordierite, steatite.

10. The device according to claim 2, wherein the porosity $\epsilon$ of each of the upstream and downstream porous elements is between 0.8 and 0.9.

11. The device according to claim 4, wherein the average diameter of the substantially sphere-shaped hollow spaces is 2 to 10 mm.

12. The device according to claim 4, wherein the average diameter of the holes is in a range of 0.1 to 2 mm.

* * * * *